United States Patent [19]

Eibe

[11] E Re. 31,344

[45] Reissued Aug. 16, 1983

[54] SEMI-CONTINUOUS HOT ROLLING OF METAL STRIP AND PLATES

[75] Inventor: Werner W. Eibe, McCandless Township, Allegheny County, Pa.

[73] Assignee: White Consolidated Industries, Inc., Cleveland, Ohio

[21] Appl. No.: 382,595

[22] Filed: May 27, 1982

Related U.S. Patent Documents

Reissue of:

[64] Patent No.: 4,296,623
Issued: Oct. 27, 1981
Appl. No.: 74,876
Filed: Sep. 12, 1979

[51] Int. Cl.[3] ..... B21B 1/34; B21C 47/00

[52] U.S. Cl. ..... 72/227; 72/146; 72/250; 72/366; 242/78.7

[58] Field of Search ..... 72/146, 226, 227, 229, 72/231, 234, 250, 365, 366, 363, 129, 130, 203; 242/78.1, 78.6, 78.7, 83; 29/18

[56] References Cited

U.S. PATENT DOCUMENTS

| | | | |
|---|---|---|---|
| 361,591 | 4/1887 | Lenox | 72/227 |
| 1,029,673 | 6/1912 | Daniels | 242/78.1 |
| 1,680,522 | 8/1928 | Jones | 29/18 |
| 2,078,005 | 4/1937 | Lloyd | 72/250 |
| 2,231,400 | 2/1941 | Washburn et al. | 72/146 |
| 2,658,741 | 11/1953 | Schmidt | 263/3 |
| 2,920,838 | 1/1960 | Priestley | 72/146 |
| 2,996,937 | 8/1961 | Cramer | 72/234 |
| 3,079,976 | 3/1963 | Ranney | 72/234 |
| 3,803,891 | 4/1974 | Smith | 72/250 |
| 3,805,570 | 4/1974 | Smith | 72/146 |

FOREIGN PATENT DOCUMENTS

| | | |
|---|---|---|
| 471928 | 9/1937 | United Kingdom . |
| 652772 | 5/1951 | United Kingdom . |

OTHER PUBLICATIONS

"A New Economical Concept For Producing Hot Strip and Plate", Werner W. Eibe, Iron and Steel Engineer, Sep. 1981, pp. 25–36.

Klepzig-Fachberichte, Oct. 1966, pp. 454–455.

*Primary Examiner*—Daniel C. Crane
*Assistant Examiner*—Jonathan L. Scherer
*Attorney, Agent, or Firm*—Buell, Blenko, Ziesenheim & Beck

[57] ABSTRACT

The mill comprises essentially a roughing train having a reversing roughing stand or stands and a finishing train having a reversing finishing stand or in-line finishing stands, the roughing and finishing trains being disposed with pass lines parallel to each other and at different elevations, the work in the roughing train progressing in the opposite direction from the work in the finishing train. The roughing train for strip and light plate is provided with a hot upcoiler at each end positioned above the table so that slabs and breakdowns pass beneath them, but adapted to coil and payout strip of coiling gauge. The delivery end of the roughing train is laterally opposite the entry end of the finishing train and separate mechanisms are provided for transferring coils and plate broadside from roughing train to finishing train. The run-out table for strip and light plate extends in front of the slab heating furnaces, so drastically shortening the length of the mill building without greatly increasing its width. Cooling beds for plates are [arraned] *arranged* at right angles to that table. A wide plate mill comprising a reversing breakdown stand with turn-arounds and a reversing finishing stand arranged in the same way as the strip and light plate mill may be added on the other side of the heating furnaces, so utilizing some of the cooling facilities of the strip and light plate mill.

14 Claims, 10 Drawing Figures

SEMI-CONTINUOUS HOT ROLLING OF METAL STRIP AND PLATES

Matter enclosed in heavy brackets [ ] appears in the original patent but forms no part of this reissue specification; matter printed in italics indicates the additions made by reissue.

This invention relates to the hot rolling of metal strip and plates. It is more particularly concerned with apparatus and method for semi-continuous hot rolling of steel providing a considerable saving in space requirements, capital and operational expense.

BACKGROUND OF THE INVENTION

Over the past 50-odd years continuous hot strip mills have grown enormously in length. One of the first such mills, built in 1926 for rolling steel strip, had an overall length of 735 feet from its number 1 furnace to its coiler, and used a typical slab of 4,800 pounds weight. A present day mill spaced for rolling a slab of 2,000 pounds per inch width to a coil would extend about 1,940 feet from its number 1 furnace as to its last down-coiler. A high production mill of this type would have at least four furnaces and the run-out table for those would extend the length of the mill to about 2,240 feet. Depending on slab width, the mill could handle slab and coil weights up to 120,000 pounds for a 60" wide strip.

Mills of this type realize their full efficiencies only when rolling the largest size coils, but seldom roll such coils because of limited slab heating capacity, limitations on the stand motors, and coil handling difficulties in down-stream operation. Most of the time, the mill rolls smaller coils thereby under-utilizing the mill, its driving motors and the space occupied by the entire installation. At their best, continuous hot strip mills are wasteful of space because of the irregular ground area they cover. The mill itself is long and narrow, but the heating furnaces grouped at the entry end require a plot of considerable width, the motor and control room, which is usually on the same side of the mill as the furnaces, requires extra width and encloses much unused space between the widely spaced roughing stands, and the roll shop, usually on the opposite side of the mill from the motor room, should be centrally located with respect to roughing and finishing stands so as to minimize the travel distance through which rolls must be moved between roll stands and the roll shop. Thus, this mill 2,240 feet long, as presently constructed, may require 350,000 square feet of ground area. Only about 40% of the total cost of a continuous hot strip mill is allocated to the mill, electrical apparatus and heating equipment. The remainder goes for buildings, cranes, foundations, utilities and other accessories.

Efforts have been made to alleviate the problem above mentioned by building semi-continuous mills. Instead of having a continuous roughing train of five or six stands with associated edgers, semi-continuous mills normally use one or two roughing stands only, one or both of which are direct current driven reversing stands. The reversing stand or stands reduce the slab in a series of passes before it goes into the finishing train. All stands, of course, are still in line and although there is a substantial saving in overall length of the mill, it is at the expense of its productivity. A variation of this design, sometimes called a three-quarter-mill, uses a roughing train the last two stands of which are closecoupled so that the slab is in both stands for a common unidirectional pass.

Smith U.S. Pat. Nos. 3,803,891 and 3,805,570 disclose another proposed solution. The delay table, so-called, between the roughing and finishing trains is shortened by introducing a coiler and coiling the normally stretched out transfer bar, which is then uncoiled from the coiler into the finishing stands. All stands are still in line.

SUMMARY OF THE INVENTION

It is an object of my invention to provide apparatus and method for hot rolling metal strip and plates which reduce mill costs other than those for the mechanical, electrical and heating equipment. It is another object to provide hot rolling apparatus which requires ground area of appreciably reduced length and no increase or only a slight increase in width from that required by presently known hot rolling apparatus, as well as a method for hot rolling metal using that apparatus. It is still another object to provide a more compact mill layout permitting mill operations from a smaller number of control points or pulpits than are required for fully continuous mills. Other objects of my invention will appear in the course of the description thereof which follows:

The apparatus of my invention comprises a roughing train and a continuous finishing train which are not in line, but are arranged side-by-side, together with apparatus for collecting and transferring the product of the roughing train laterally thereof to the finishing train. The collecting apparatus is positioned at the end of the roughing train and the delivery apparatus at the beginning of the finishing train and between the two are positioned means for transferring work laterally from the collecting apparatus to the delivery apparatus. The work moves through the roughing train and from there in an opposite direction through the finishing train. The collecting apparatus is an upcoiler in a strip mill and a conveyor table in a plate mill. The delivery apparatus is a pay-out station in a strip mill and a conveyor table in a plate mill. The roughing train comprises a reversing stand and may include a second stand which may be either a reversing or non-reversing stand. Another upcoiler is included between the heating furnaces and the reversing stand. The finishing train includes a shear positioned between the delivery means and the first finishing stand, but is otherwise conventional. The pass lines of the roughing train and finishing train are not at the same elevation. The pass line of the roughing train, which is preferably adjacent the drive motors, is higher than that of the finishing train, so that the spindles to the stands of the finishing train pass under the roughing train tables.

DESCRIPTION OF PREFERRED EMBODIMENT

Figure 1A:
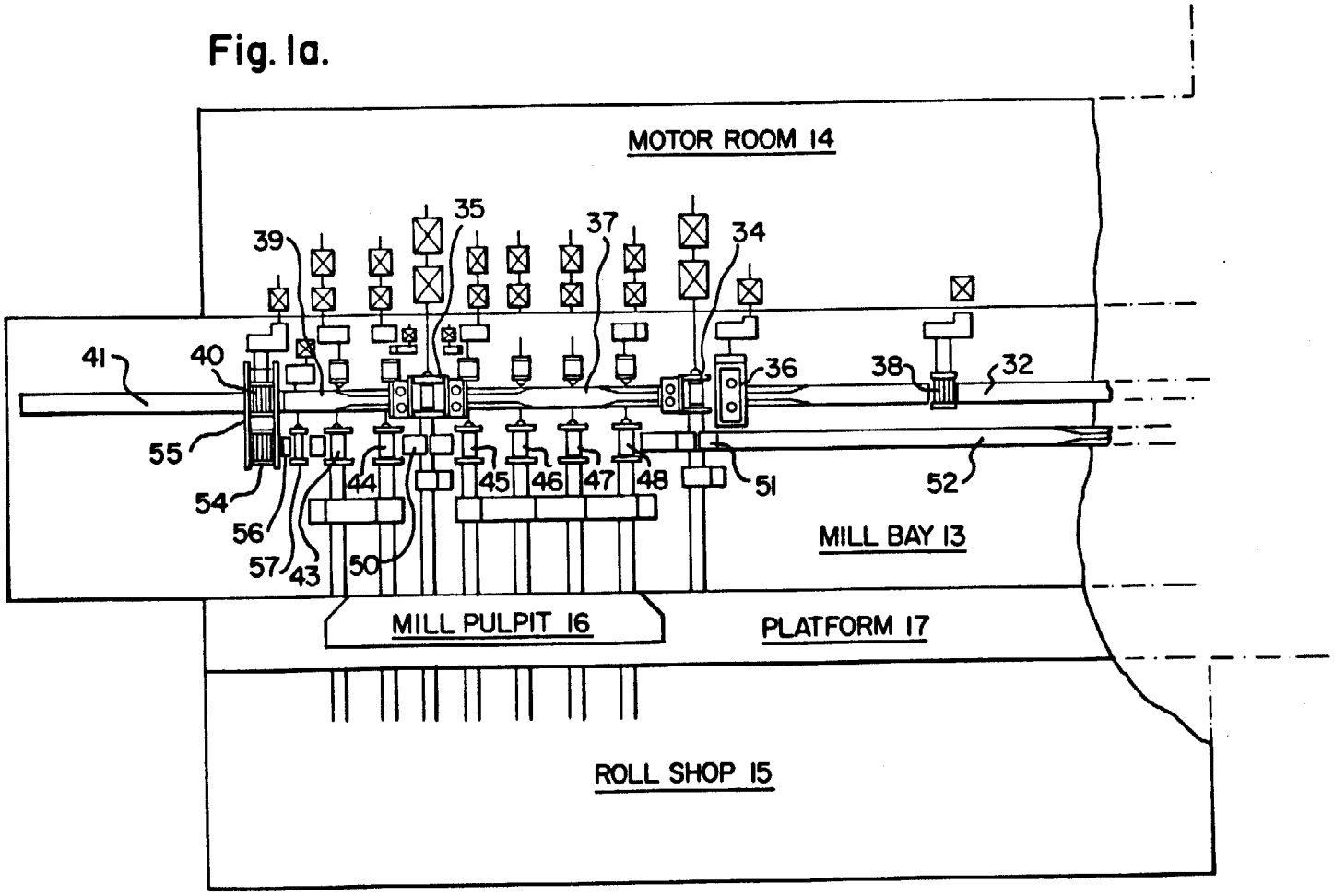
FIGS. 1*a* and 1*b* comprises a plan of an embodiment of my apparatus for rolling and coiling hot strip.
Figure 1B:
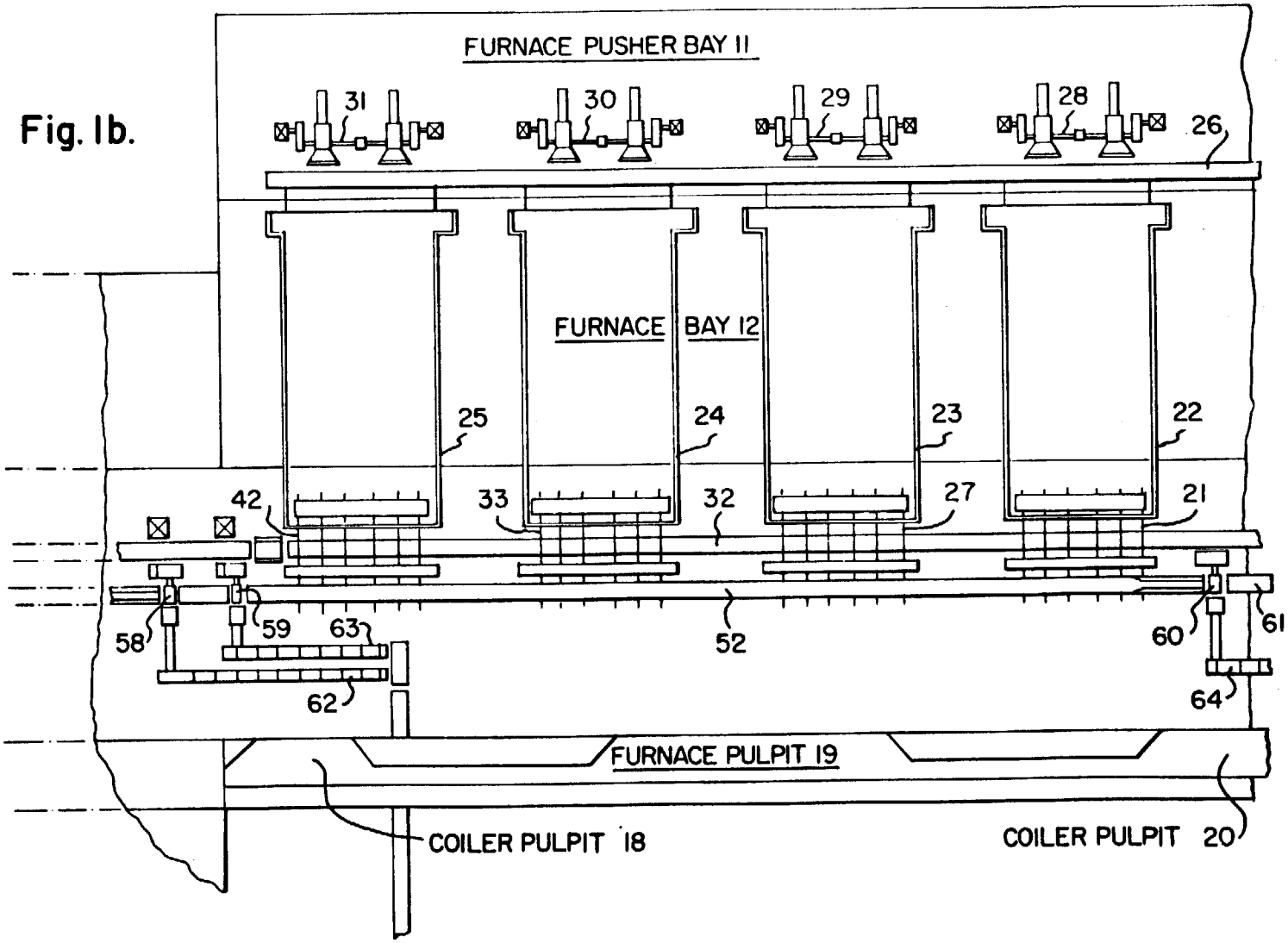

My apparatus, broadly, as is shown in FIGS. 1*a* and 1*b* comprises a furnace pusher bay 11, a furnace bay 12 adjacent thereto, an elongated mill bay 13 extending the full length of the furnace bay and beyond one end thereof, a motor room 14 adjacent the furnace bay and also that portion of the mill bay that extends beyond the furnace bay, and a roll shop 15 directly opposite the motor room on the other side of the mill bay. Auxiliary apparatus includes a mill pulpit 16 within the roll shop, adjoining the mill on a platform 17 elevated above the floor of the roll shop and extending opposite the furnace bay parallel thereto. The mill pulpit 16 is directly opposite the stands of the finishing and roughing trains, to be described. On platform 17 is an elongated structure paralleling the furnace bay 12 and opposite therefrom, including a first coiler pulpit 18, a furnace pulpit 19 and a second coiler pulpit 20 in that order, starting from the inside end of the roll shop 15.

FURNACE PUSHER BAY AND FURNACE BAY

Furnace bay 12 houses four slab heating furnaces, 22, 23, 24 and 25, numbered from the outside end of the bay. Those furnaces have charging ends adjacent the furnace pusher bay 11. Slabs for charging are brought in on a track or conveyor 26, which extends along the charging ends of the furnaces in furnace pusher bay 11. On the other side of track 26 are positioned separate conventional pusher devices 28, 29, 30 and 31, which are aligned with heating furnaces 22, 23, 24 and 25, respectively. The discharge ends of the above mentioned furnaces extend into mill bay 13.

MILL BAY

A run-in table 32 for the mill, to be described, extends along and in front of the discharge ends of the heating furnaces above mentioned and beyond the end of furnace bay 12. Table 32 is a conventional conveyor table provided with power-driven rolls. Conventional extractor devices 21, 27, 33 and 42 are provided at the discharge ends of each furnace respectively to position successive slabs from each furnace on the run-in table 32.

MILL BAY-ROUGHING TRAIN

Conveyor table 32 extends to a first four-high reversing roughing stand 34. This stand is immediately preceded by a power driven edger 36, having conventional side guides at its entry end. A conveyor table 37 extends from roughing stand 34 to a second roughing stand 35. Roughing stand 34 has conventional side guides, extending onto table 37 and roughing stand 35 also has conventional side guides extending over that table. Table 37 is long enough to accept the first pass of the longest slab which the furnaces in furnace bay 12 can accommodate. Between edger 36 and furnace bay 12, an upcoiler 38 is located over table 32, clearing it by a distance sufficient to allow a slab from the furnace to pass beneath it into edger 36. Upcoiler 38 is constructed with a movable guide so as to receive strip from roughing stand 34, after it has been rolled to coiling gauge, and to pay such strip back into roughing stand 34 for further rolling, as will be described. Second roughing stand 35 is followed by a conveyor table 39, which in turn is followed by an upcoiler 40 which alternately receives strip from roughing stand 35 and pays it off to that stand when the rolling direction of the stand is reversed, for further reduction. Upcoiler 40 is followed by run-out table 41, which is an extension of table 39. Roughing stand 35 has side guides extending over table [29] *39*. Both roughing stands may also be provided with vertical edging rolls.

MILL BAY-FINISHING TRAIN

Figure 2A:
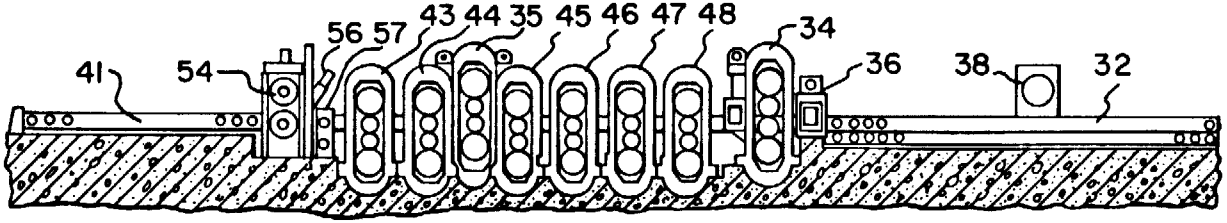
FIGS. 2*a* and 2*b* comprise a side elevation of the apparatus of FIG. 1.
Figure 2B:
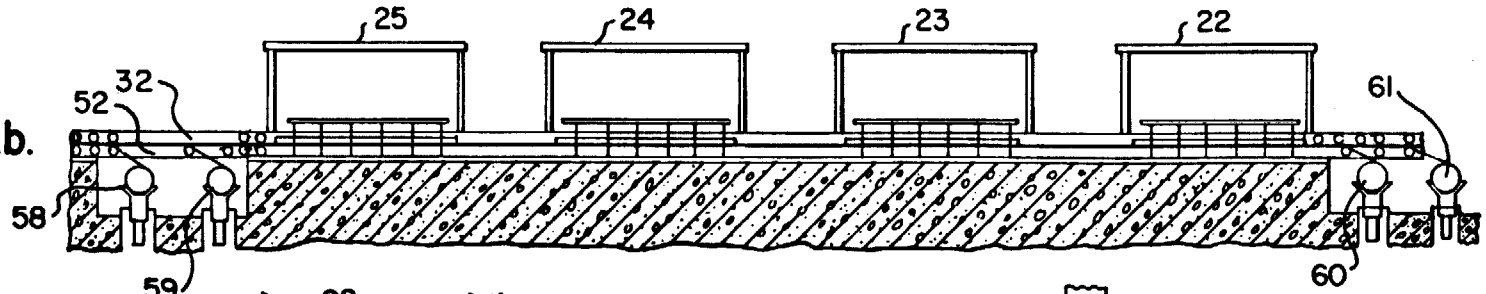

The finishing train is unidirectional and comprises six roll stands 43, 44, 45, 46, 47 and 48, numbered in reverse direction from the roughing train and spaced laterally therefrom. The pass line of this train is spaced below the pass line of the roughing train a distance sufficient to permit all stands of both trains to be driven from the roughing train side. The drive spindles for the stands of the finishing train pass below the tables 37 and 39 of the roughing train. This arrangement is more easily seen in FIGS. 2 and 5. The second finishing stand 44 and the third finishing stand 45 are spaced from each other and are positioned longitudinally on either side of roughing stand 35, so that the rolls from that stand can be removed and taken out between those finishing stands to the roll shop. Likewise, roughing stand 34 is spaced longitudinally downstream of the last finishing stand 48 for the same purpose. The transfer table 50 between finishing stands 44 and 45 is split in the middle and each portion is hinged at its other end so that rolls removed from roughing stand 35 can be passed through. Likewise, the portion 51 of run-out table 52 from finishing stand 48 is split and hinged opposite roughing stand 34 for the same purpose.

Strip is supplied to the finishing train from a pay-off station 54 which receives coils from coiler 40 by way of a transfer mechanism 55 to be described. A coil opener 56 and a flying shear 57 are located between pay-off station 54 and the first stand 43 of the finishing train. Strip from the finishing train is carried by run-out table 52, which extends parallel to run-in table 32 for substantially its full length but causes the work to travel in the opposite direction from that on table 32. Tandem downcoilers 58 and 59 are positioned below table 52 at a distance from the last finishing stand 48 sufficient for the cooling of thin strip. Tandem downcoilers 60 and 61 are provided further along table 32 for heavier strip. Run-out table 52 is provided with conventional water quenching apparatus, not shown. Downcoilers 58 and 59 deliver coils onto conveyor apparatus 62 and 63 respectively for further cooling the strip in coils, and downcoilers 60 and 61 likewise deliver coils to like apparatus 64 and 65.

MILLBAY-UPCOILER, PAYOUT STATION AND TRANSFER MEANS

Figure 4:
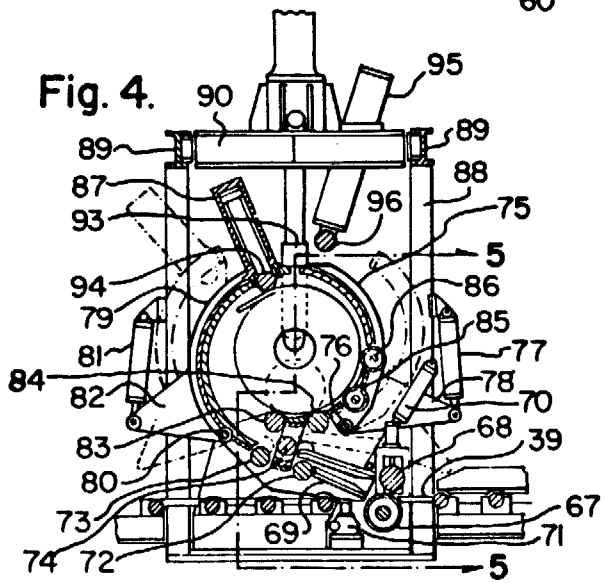
FIG. 4 is a side elevation in section on the plane 4—4 of FIG. 5 of the strip coiling apparatus indicated in FIGS. 1 and 2.
Figure 5:
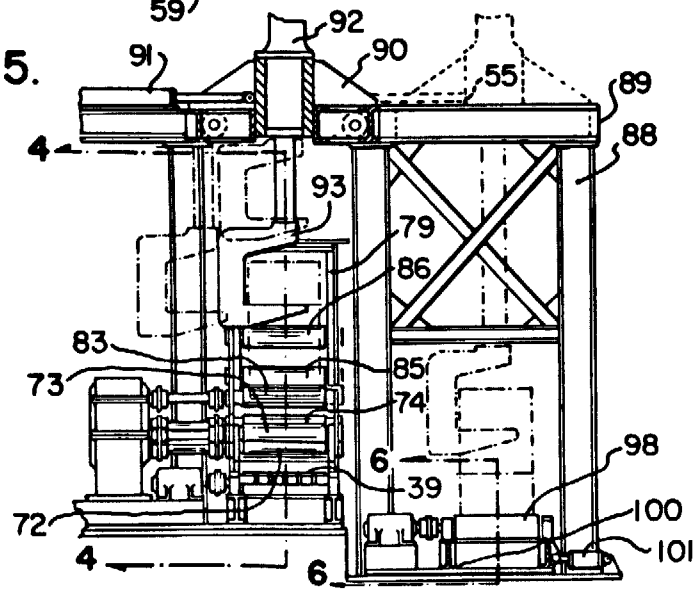
FIG. 5 is an end elevation in section of the apparatus of FIG. 4, takes on the plane 5—5 of FIG. 4.

The above-mentioned apparatus is shown in detail in FIGS. 4 and 5. Upcoiler 40, shown in section in FIG. 4, has no mandrel. A lower driven pinch roll 67 is incorporated in run-out table 39. An upper pinch roll 68 is adjustably mounted so that it can be raised to clear a slab on table 39 or lowered against roll 67 to engage strip and feed it into entry guide 69 of upcoiler 40. That guide is pivoted at its delivery end and can also be raised to clear a slab on table 39 by hydraulic cylinder 70. The lower position of guide 69 is adjusted by jack 71. At the delivery end of guide 69 are two lower driven bending rolls 72 and 73 and an upper driven bending roll 74 positioned between them which engage the strip and bend it upwardly into the coiler. Those rolls are positioned within a clamshell or split housing in the form of a scroll within which the strip is coiled. The housing is split on a vertical plane containing the coil axis. The shell portion 75 nearer run-out table 39 is arcuate in shape and pivotally mounted at its lower end 76 so as to be rotated about that end by hydraulic cylinder 77 acting on lever arm 78 attached to shell portion 75. The upper end of hydraulic cylinder 77 is attached to structural framework 88. The opposite shell portion 79 is pivotally mounted at its lower end 80 so as to be rotated about that end by hydraulic cylinder 81 acting on lever arm 82 attached to shell portion 79. The upper end of hydraulic cylinder 81 is likewise attached to structure 88. The shell portions 75 and 79 are mounted so that their upper edges meet when the shells are closed but shell portion 75 is curved to a shorter radius than shell portion 79 so that the lower end 76 of shell portion 75 clears the highest position of entry guide 69, while the lower end 80 of shell portion 79 is positioned so that strip passing through bending rolls 72, 73 and 74 travels over it into shell portion 79 and curves around therein. Driven cradle rolls 83 and 84 are mounted so as to be a continuation of the arc of shell portion 75 at its lower end straddling the vertical central plane of the coiler, and additional cradle rolls 85 and 86 are provided in shell portion 75 in like manner, but above rolls 83 and 84.

Near its upper end, shell portion 79 carries an externally projecting hydraulic cylinder 87, carrying at the lower end of its piston within shell portion 79 a roll 94 which when depressed holds the trailing end of the coil inside the shell portions 75 and 79 against its underlying wraps.

The transfer mechanism 55 is supported above coiler 40 and payoff station 54 by framework 88 which carries a pair of spaced transverse rails 89-89. On those rails is mounted a wheeled transfer car 90 which is shifted from a position over coiler 40 to a position over payoff station 54 by a hydraulic cylinder 91 also supported by framework 88. Transfer car 90 carries an upright hydraulic lift cylinder 92 projecting above it, the piston end of which terminates in a C-hook 93 extending below it. Hook 93 in its raised position clears shell portions 75 and 79 in their closed position. Transfer car 90 also carries a second upright hydraulic cylinder 95 adjacent cylinder 92, the piston of which terminates in a roll 96 at its lower end. Roll 96 in its retracted position clears shell portions 75 and 79. It is lowered to its extended position when shell portions 75 and 79 are opened, and bears against the trailing end of the coil, which otherwise would be freed by withdrawal of roll 94.

Upcoiler 38 is constructed in the same way as upcoiler 40 above described but faces in the opposite direction and is not provided with transfer apparatus.

MILLBAY-PAYOFF STATION, COIL OPENER AND SHEAR

Figure 6:
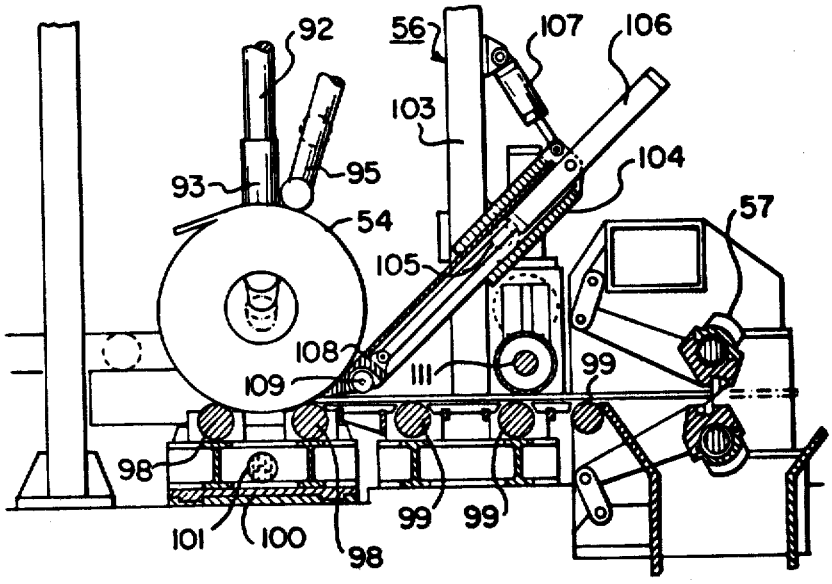
FIG. 6 is a side elevation in section on the plane 6—6 of FIG. 5 of coil payoff apparatus indicated in FIGS. 1 and 2.

Payoff station 54 is shown in FIGS. 5 and 6. It includes a pair of driven rolls 98 spaced from each other as part of a run-in table 99 for stand 43 of the finishing train. Coils from upcoiler 40 are deposited on rolls 98 by transfer car 90. Rolls 98 are mounted on platform 100 which is shiftable transversely of run-in table 99 by hydraulic cylinder means 101. The shifting is automatically controlled by conventional apparatus to keep the payoff station in line with the strip traveling through the finishing train. Immediately following payoff station 54 is coil opening apparatus 56, mounted on framework 103 which straddles table 99. Housing 104 is pivotally mounted on horizontal shaft 105 journalled in framework 103 and is rocked on shaft 105 by hydraulic cylinder 107 connected between framework 103 and housing 104. Within housing 104 is hydraulic cylinder 106, the piston rod of which extends downwardly and terminates in a transverse nose or blade 108 adapted to pry open the outside end of a coil of strip resting on rolls 98 so that the end passes underneath nose 108. That nose journals a transverse freely rotatable roll 109 projecting below its lower surface so as to space nose 108 out of contact with strip passing beneath it. Following coil opener 56 is a vertically adjustable pinch roll 111 positioned immediately above a roll of table 99. Following roll 111 is a conventional flying shear 57.

MOTOR ROOM

Motor room 14 houses the individual drive motors for each stand of the roughing train and each stand of the finishing train, as well as the motors for upcoilers 38 and 40, and edger 36. As has been mentioned, the drive spindles for the stands of the finishing train pass under the tables of the roughing train.

ROLL SHOP

Roll shop 15 houses conventional turning, grinding and other apparatus for roll dressing. The rolls from the finishing train stand are moved axially directly into the roll shop and the rolls from the roughing train are likewise moved axially through the finishing train, as has been described, directly into the roll shop. The means for removing and transporting the rolls are conventional and are not shown. The arrangement of the mill and buildings above described makes it unnecessary to move the rolls in any other direction to reach the roll shop, or to use a crane or special buggies for that transfer.

OPERATION OF PREFERRED EMBODIMENT—ROUGHING TRAIN AND TRANSFER APPARATUS

A slab from one of the heating furnaces in furnace bay 12 is pushed out by the furnace pushers associated with the furnace and is loaded onto run-in table 32, which propels it under upcoiler 38, its entry guide 69 being raised as described hereinabove, to edger 36. There it is given one pass by that edger and by first roughing stand 34. The slab so treated is run-out clear of stand 34 onto table 37, then through second roughing stand 35 onto tables 39 and 41, under upcoiler 40, and back through the reversed roughing stand onto table 37, and this is repeated until the product is thin enough to be coiled. Roughing stand 34 may be opened up during this rolling or the elongated slab may be rolled by that stand as well as by stand 35 when it is in both stands. When the strip is thin enough to be coiled, for example into upcoiler 40, the coiler entry guide 69 is tilted downward by hydraulic cylinder 70 and the strip end is directed into guide 69 by pinch rolls 67 and 68. The shell portions 75 and 79 are rotated by their respective hydraulic cylinders 77 and 81 until their upper ends meet. The strip passes through bending rolls 72, 73 and 74 where it is bent upwardly and is guided around the inside surface of shell portions 79 and 75, against rolls 85 and 86 of portion 75 into a coil which is supported and rotated on cradle rolls 83 and 84. After the strip is coiled to the capacity of the coiler, it is then paid out of the coiler for further rolling in the roughing stands by reversing the direction of rotation of the driven cradle rolls 83 and 84. The bending rolls 72, 73 and 74 are opened up and also reversed in rotation for this purpose. Pinch rolls 67 and 68 and kept closed, assisting the strip to be fed into rougher 35. The strip driven in a reverse direction by roughers 35 and 34 is similarly coiled in upcoilers 38 at the entry end of the roughing train and is paid out of that coiler by reversing its action in the way described. When the strip has been reduced to the desired thickness in the roughing stands and is coiled inside the closed shell portions 75 and 79 of upcoiler 40, the coil is rotated until its trailing end is below roll 94. Cylinder 87 is then operated to bring roll 94 against the strip end and hold it in place.

Transfer car 90 is positioned on track 89 by cylinder 91 to align C-hook 93 with the eye of the coil. Shell portions 75 and 79 are tilted away from each other by their respective cylinders and transfer car 90 is shifted toward the finishing train to insert C-hook 93 into the coil eye. Hydraulic cylinder 95 is operated to bring roll 96 down against the coil trailing end and hydraulic cylinder 87 is operated to raise roll 94 out of contact with the coil. Transfer car 90 is shifted further toward the finishing train, carrying the coil broadside out of upcoiler 40 and over payoff station 54, and the coil is lowered onto rolls 98 thereof by cylinder 92. Roll 96 is retracted and transfer car 90 is shifted in the opposite direction to remove C-hook 93 from the coil eye. Cylinder 92 is again operated to raise C-hook 93 to its uppermost position, where it clears coiler 40, and transfer car 90 is shifted back beyond coiler 40, where it remains until the cycle is repeated. The shell portions of coiler 40 are closed immediately after the coil is withdrawn therefrom and strip from the next slab is coiled therein. No time is lost between these operations because C-hook 93 is carried back over coiler 40 above the closed shells, as has been mentioned.

OPERATION OF PREFERRED EMBODIMENT—PAYOFF DEVICE AND FINISHING TRAIN

Rolls 98 of payoff station 54 are driven in the counter clockwise direction as shown in FIG. 6, until the trailing end of the coil is on table 99. Coil opener 56 is then positioned by cylinders 106 and 107 so that nose 106 is inserted between the coil end and the next coil wrap. Rolls 98 are then driven clockwise causing the coil end to travel over the table rolls 99, under roll 109, and into pinch rolls 111 and table roll 99. Nose 108 is then retracted. The strip is then introduced into the finishing train and passes through it unidirectionally in the conventional manner. Flying shear 57 is operated not only to crop the ends of the strip, but also to divide the strip when finished coils are desired which are submultiples in weight of the slab.

The strip from the finishing train passes over run-out table 52 and is quenched thereon in the usual manner. It is coiled by one or the other of tandem coilers 58 and 59 or by one or the other of tandem coilers 60 and 61, depending on its thickness. It will be evident that the coil storage facilities in my arrangement here described will be near the end of run-out table 52, which is in the vicinity of slab storage, so that both coils and slabs can be transported by one carrier system.

DESCRIPTION OF NARROW PLATE ROLLING MODIFICATION

Figure 3A:
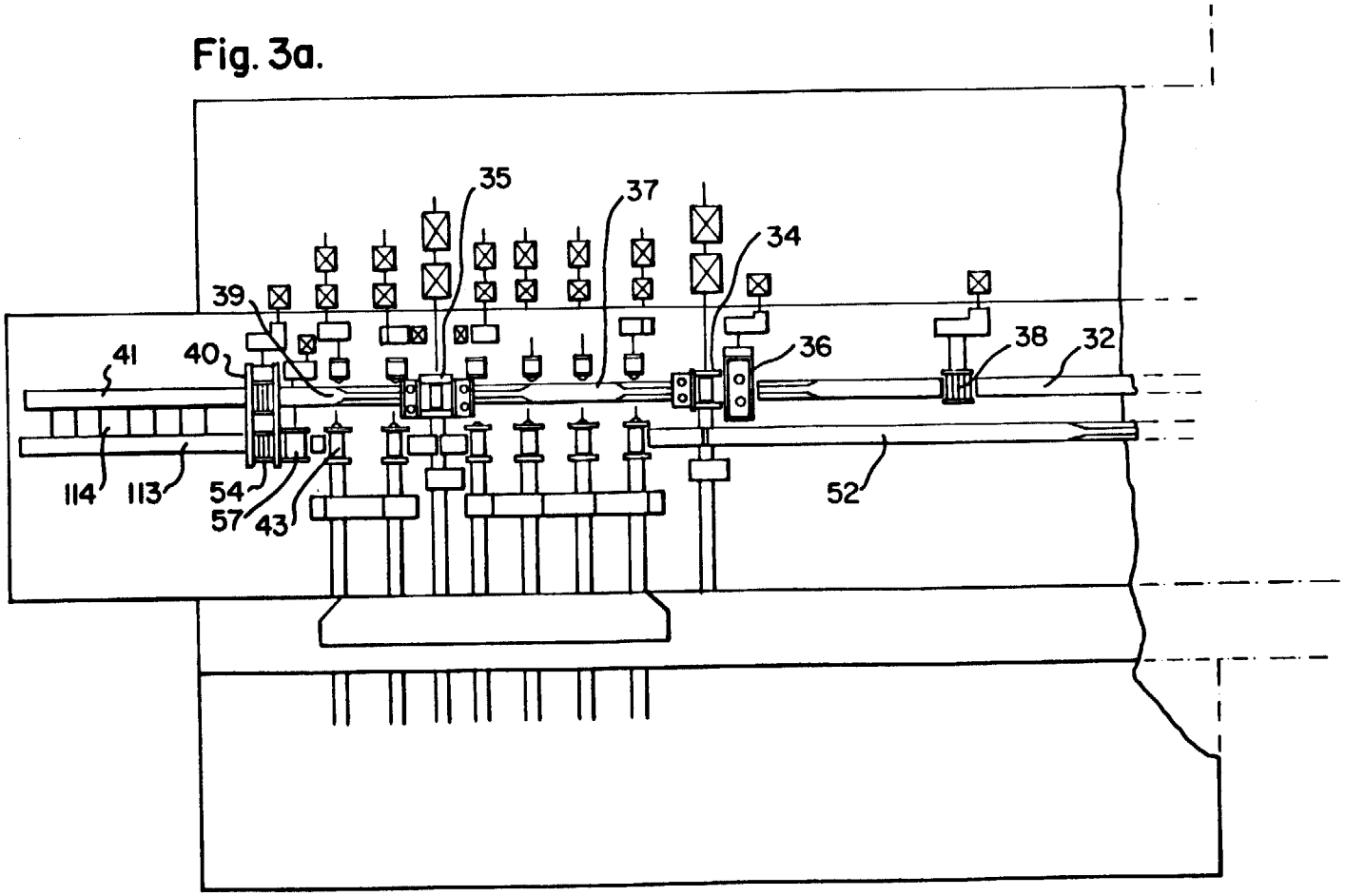
FIGS. 3*a*, 3*b* and 3*c* comprise a plan of a modification of the apparatus of FIG. 1 for rolling plates as well as strip.
Figure 3B:
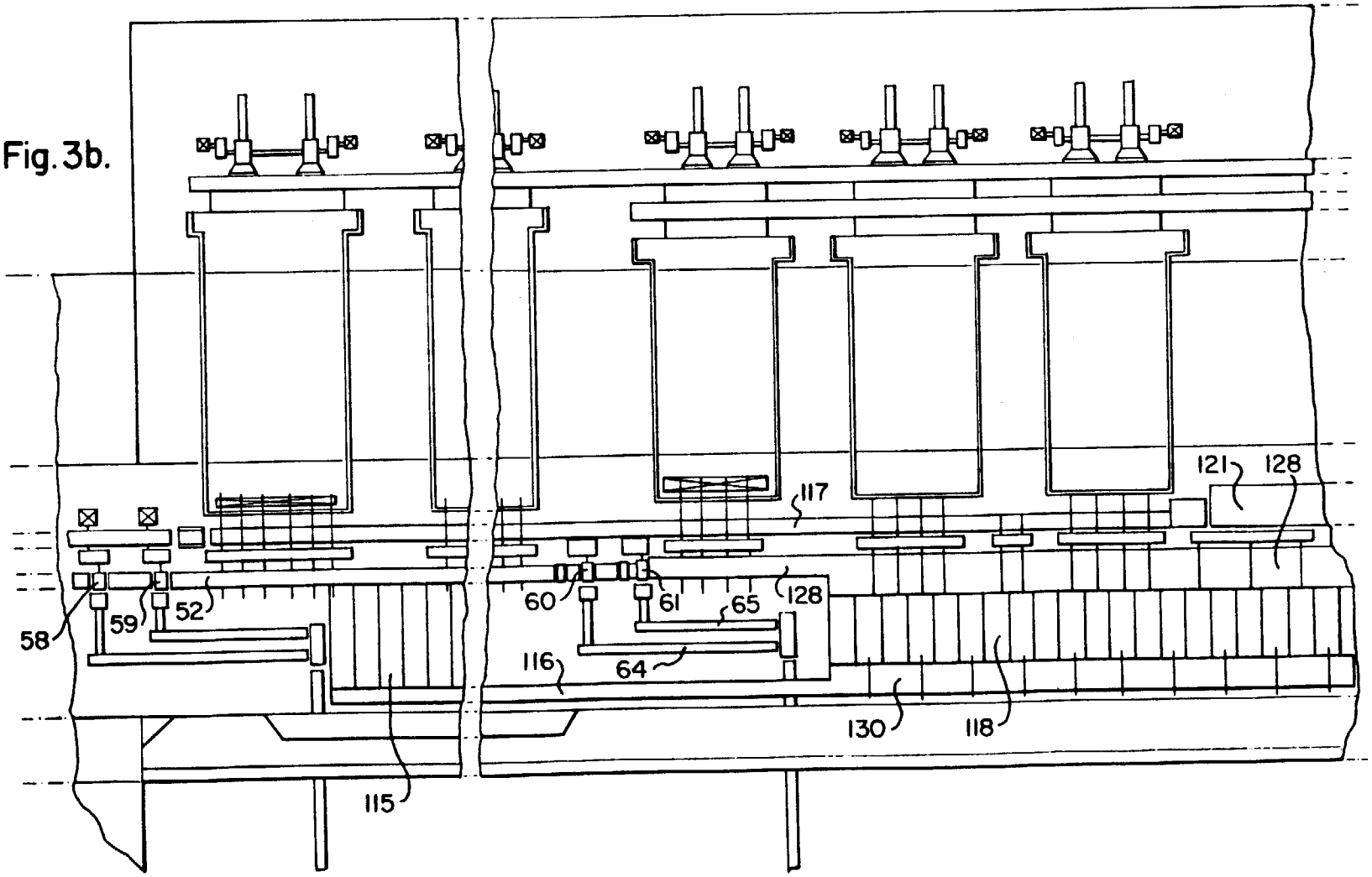

My apparatus above described is also adapted to rolling plate, in widths limited by stands of the roughing and finishing trains, with few changes. The modified mill is shown in FIGS. 3a and 3b. As the greater part of the apparatus is unchanged from that of the coil rolling embodiment described hereinabove, the duplicated elements carry the same reference characters as have been previously applied to them and will not be described in detail. The modifications are found only in mill bay 13.

Preceeding payoff station 54 at the entry end of the finishing train is a plate cooling and run-in table 113 parallel to table 41, but at the lower elevation of the finishing train. Table 113 is provided with water cooling apparatus, now shown. Between tables 41 and 113 is located plate transfer apparatus 114, which is conventional.

Adjoining run-out table 52 of the finishing train and located between first downcoilers 58 and 59 and second downcoilers 60 and 61 is a conventional plate cooling bed 115. That bed extends at right angles to table 52 and its opposite side abuts a plate conveyor table 116, which parallels table 52. Run-in table 32 of the roughing train is extended in the opposite direction from furnace bay 12 as plate conveyor table 117. Run-out table 52 is also extended to table 128, a portion of which is widened for wide plate rolling, to be described. Between this conveyor table 128 and conveyor table 130, which is a widened extension of table 116, is a second plate cooling bed 118. Conventional transfer apparatus is provided between conveyors 52, 116 and 128 and cooling beds 115 and 118. Cooling bed 116 can receive narrow plates only, whereas cooling bed 118 can receive narrow plate from the continuous finishing train 43 to 48 or wide plate in opposite direction from a wide finishing plate mill 127, if installed. Conveyor table 130 extends into finishing equipment of conventional type for heavy and light plate.

OPERATION OF NARROW PLATE MODIFICATION

The roughing train operates in the way described herein for coils when plates thin enough to be coiled in upcoilers 38 and 40 are rolled. Thicker plates are rolled to the desired transfer gauge in reversing stands 34 and 35 are run out therefrom on tables 32, 39 and extension 41 without coiling. A plate of the desired thickness on table 41 is then transferred to adjoining table 113 of the finishing train by transfer apparatus 114. It is cropped in shear 57 and divided during travel by that shear if required, and rolled unidirectionally through the finishing train onto the run-out table 52 until it is opposite plate cooling bed 115, or alternately cooling bed 118. It is then transferred broadside to those beds by conventional apparatus and allowed to cool on them as it is moved slowly thereon until it reaches conveyor table 116 or 130, respectively. It is then transferred broadside to those tables by conventional means. It then continues to finishing operations for heavy and light plate.

DESCRIPTION OF WIDE PLATE ROLLING MODIFICATION

Figure 3C:
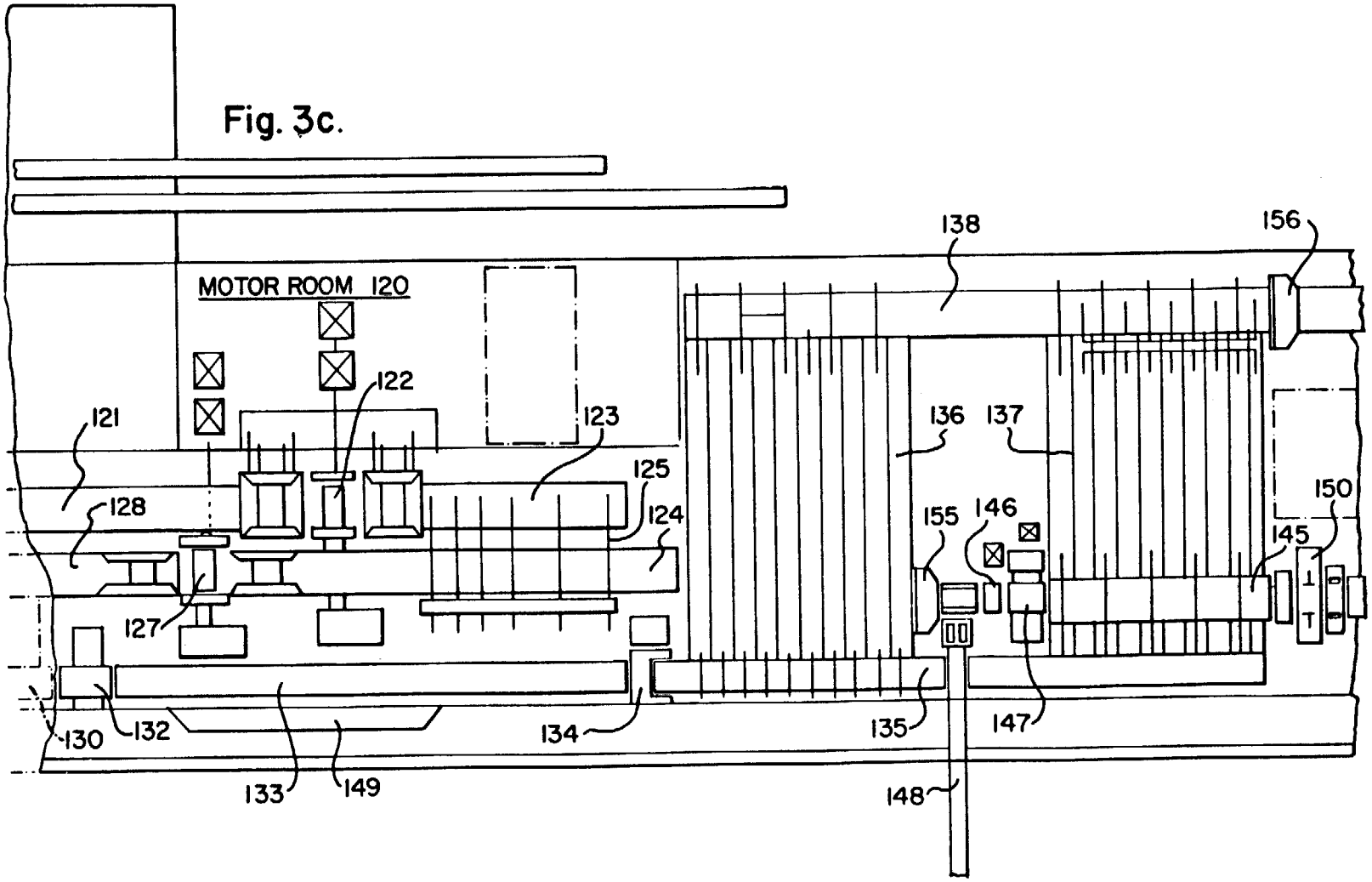

My apparatus described hereinabove is easily adapted to the addition of conventional facilities for rolling wide plate. Those facilities, shown in FIG. 3c, are located in the mill bay 13 at the other end of the furnace bay 12 so that all facilities receive slabs from the same group of furnaces. The plate rolling stands to be described hereinafter require motor and drive apparatus which are located in a second motor room 120 immediately adjacent to furnace bay 12 at the opposite end from motor room 14 and on the same side of mill bay 13 as that motor room. Conveyor table 117 is extended in front of second motor bay 120 as conveyor table 121, which is wider than conveyor table 117 for reasons which will appear. That conveyor services a conventional reversing plate breakdown stand with plate turn-arounds 122. A like conveyor 123 extends from the other side of the breakdown stand. Parallel to conveyor table 123 and extending back in the direction of breakdown stand 122 is a like conveyor table 124, but at a lower elevation than conveyor table 123. Conventional transfer means 125 are arranged to transfer breakdowns from table 123 broadside to table 124. That table services a conventional finishing stand with side guides 127 which is offset laterally from breakdown stand 122 and also offset longitudinally therefrom in the direction of furnace bay 12. The drive spindles for finishing stand 127 pass under table 121 to its motor in motor room 120. On the other side of finishing stand 127 a conveyor table 128 extends in the direction of furnace bay 12 and joins conveyor 52. Plate cooling bed 118 is disposed normal to conveyor table 128 and extending away from furnace bay 12. At its far end a conveyor table 130, which is an extension of conveyor table 116, extends back longitudinally toward finishing stand 127, but displaced laterally therefrom, to a first conventional plate leveller 132. From that leveller a conveyor table 133 extends in the same direction to a first dividing shear 134. The sheared plates therefrom pass over conveyor 135, either to an all-width cooling bed 136, extending normal to conveyor 135, or to an inspection bed 137 provided with conventional turnover and transfer mechanisms positioned adjacent and parallel to cooling bed 136. The other ends of cooling bed 136 and inspection bed 137 discharge on to conveyor table 138 normal thereto and extending away from motor room 120 to heavy plate finishing equipment.

Above inspection bed 137 and normal thereto is positioned a reject and cooling bed bypass conveyor table 145, which moves plates in the same direction as conveyor 138. At the entry end of conveyor table 145, between cooling bed 136 and inspection bed 137, is a coil opener 146 followed by a coil leveller 147. Heavy strip coils are brought to opener 146 by conveyor 148, which passes above conveyor table 135 transversely thereof. Conveyor 145 carries levelled coil stock to rotary trimming shear with chopper 150, followed by other finishing equipment. A plate mill pulpit 149 is located on platform 17 opposite its mill. A pulpit 155 is positioned opposite coil opener 146 in line with conveyor 145 for controlling the light plate shear line, and a pulpit 156 is positioned above table 138 for controlling a like heavy plate shear line.

OPERATION OF WIDE PLATE ROLLING MODIFICATION

As has been mentioned, the wide plate rolling apparatus above described is in itself conventional, although my arrangement of it is not, and the operation of the individual units will not be described in detail. In breakdown stand 122 slabs are rolled crosswise, then turned 90° and rolled lengthwise back and forth to produce plate stock wider than the slabs. The plate width, of course, is still limited by the dimensions of the breakdown stand. The conveyor [tabls] *tables* for the wide plate mill are all necessarily wider than those for the strip and plate mill previously described herein. The plate stock from the breakdown stand 122 is rolled to gauge in reversing finishing stand 127, and after a partial cooling on table 118 is levelled in leveller 132 and sheared in dividing shear 134 to lengths that can be accommodated by cooling bed 136. In the operation of my apparatus including both narrow and wide plate rolling mills, the narrow plate from plate cooling bed 115 may be carried by conveyors 116, 130 and 133 directly to all-width plate cooling bed 136.

The arrangement of my mill above described, with strip rolling facilities at one end of the furnace bay and plate rolling facilities at the other end, together with the doubling back of the line of travel of work from roughing stand to finishing stand in both facilities, and the location of the strip cooling facilities in front of the furnace bay provides a compact arrangement of apparatus which can be housed within a rectangular building of economical proportions. The aggregate length of the whole mill assembly need be no more than the length of a conventional in-line continuous hot strip mill, and the additional width is inconsiderable. The same furnaces are used whatever product is being rolled. My mill is well adapted for construction in steps, the strip mill first, then the additional facilities for cooling and treating narrow plate, and finally the wide plate rolling mill. If neither mill operates full time, a single crew can operate both mills.

Additional advantages follow from my arrangement. A single mill pulpit is sufficient for the control of both roughing train and finishing train. Elevating the roughing train pass line above that of the finishing train pass line allows the operators in the pulpit to observe both lines without difficulty. The separate pulpits for the two groups of down-coilers and the furnace pulpit are readily combined in a single structure. Electrical circuits are considerably shorter than they are in conventional in-line rolling. The addition of the necessary facilities for plate rolling does not increase space required to the extent it does in conventional multi-stand continuous mills. Additional heating furnaces are normally required for rolling plates, but in my arrangement the position of the necessary plate cooling beds in front of the heating furnaces requires little additional building space over that for the additional heating furnaces.

A substantial advantage of my apparatus and method is the conservation of heat of the workpiece in the coilers. In conventional multi-stand hot strip mills the leading end of the bar from the roughing train goes into the finishing train appreciably better than its trailing end is when it is rolled. This difference is largely the result of the relatively slow entry speed of the bar into the finishing train relative to its delivery speed from the roughing train. The trailing end of the bar remains on the delay table a great deal longer than the leading end and cools off in that time. When strip is rolled in my apparatus, the bar from the roughing train is coiled, is transferred in coil form to the finishing train, and is paid out from the coil into the finishing train. In a coil, the temperatures of leading and trailing ends tend to equalize. I prefer to insulate my coilers to that end, but I do not consider it necessary to provide external heat to them.

In conventional mills, the temperature difference above mentioned is lessened to some extent by "zooming" so called. In zoom rolling, the speed of the finishing line is accelerated gradually after the leading end of the bar has reached the coiler in order to put heat back into the bar by more rapid mechanical working and to reduce the time the unrolled portion of the bar remains on the delay table. This acceleration should be constant. In my apparatus and by my method, gradual acceleration is not necessary or desirable. I increase the speed of the finishing train to maximum rolling speed as fast as the driving power permits, thus maximizing production. Temperature rise during rolling in this manner in the finishing train is compensated for by reducing the temperature to which the slabs are heated in the slab heating furnaces, which reduction results in lowering the temperature of the coiled bar going into the finishing train and an appreciable amount of energy savings.

The logistic arrangement, in compact form, for three normally separate installations, namely, a hot strip mill, a narrow and wide plate mill, and a heavy coil plate shearing line in not much more space than one of these units alone normally occupies, results in a large percentage of capital investment savings.

Coiled strip and wide plate rolling can be performed simultaneously under the same personnel and management as per demand, the percentage distribution between strip and narrow or wide plate can swing within the total production capacity of all furnaces, which means a better utilization of all the installed equipment.

I claim:

[1. Apparatus for hot rolling metal workpieces into strip or plate without reheating comprising a mill table, a heating furnace adjacent the mill table positioned to discharge heated workpieces thereon, a roughing stand following the mill table, collecting means at the other end of the roughing stand from the mill table for accumulating the rolled product of the roughing stand, a finishing stand spaced both laterally and longitudinally from the roughing stand, delivery means preceding the entry end of the finishing stand laterally adjacent the collecting means, but at a different elevation therefrom, whereby both stands can be driven by separate motors on the same side of the stand, the delivery means feeding the rolled product of the roughing stand into the finishing stand, and means for transferring the rolled product of the roughing stand while it is hot from the collecting means to the delivery means, and a run out table following the finishing stand and extending in a direction different from the path of travel of workpieces leaving the delivery means in front of the discharge end of the heating furnace.]

[2. Apparatus of claim 1 in which the direction of travel of workpieces entering the collecting means is opposite that of travel of workpieces leaving the delivery means.]

[3. Apparatus of claim 1 in which the collecting means comprise an upcoiler and the delivery means comprise payoff means.]

[4. Apparatus of claim 1 in which the collecting means comprise a run-out table and the delivery means comprise a runin table.]

[5. Apparatus of claim 1 including a shear positioned between the delivery means and the finishing stand.]

[6. Apparatus of claim 1 including a reversing roughing stand following the first roughing stand and a mill table between those stands of length sufficient to accommodate the first pass of the longest workpiece introduced into the first roughing stand.]

[7. Apparatus of claim 1 including at least one additional finishing stand in line with the finishing stand.]

[8. Apparatus of claim 7 in which the gap between at least two of the finishing stands is wide enough to permit passage of the rolls from the roughing stand therethrough and in which the roughing stand is spaced laterally from the finishing stands in line with that gap.]

[9. Apparatus of claim 1 in which the roughing stand is a reversing mill.]

[10. Apparatus of claim 9 including additional means in the mill table preceding the roughing stand for collecting rolled product thereof and paying it out thereto.]

[11. Apparatus of claim 10 in which the additional means comprise an upcoiler positioned above the mill table a distance sufficient to clear hot unworked workpieces deposited on the table.]

[12. Apparatus of claim 9 in which the roughing stand is a wide plate breakdown mill and including plate turnarounds.]

[13. Apparatus of claim 1 including driving means for the roughing stand and driving means for the finishing stands positioned on the same side thereof.]

[14. Apparatus of claim 13 including a single pulpit for operating both roughing and finishing stands positioned on the other side thereof.]

[15. Apparatus of claim 13 including roll-stop means positioned on the other side thereof, so that rolls removed from the roughing stand and rolls removed from the finishing stands can be transported into the roll-shop means by movement substantially in line laterally with those stands.]

[16. Apparatus of claim 1 including a plate cooling bed adjoining the runout table in front of the heating furnace and extending away from that furnace.]

[17. Apparatus of claim 16 including a plate delivery table adjoining the end of the plate cooling bed opposite the run-out table.]

[18. Apparatus of claim 17 including a second cooling bed extending away from the plate delivery table toward the run-out table and a second plate delivery table adjoining the end of the second plate cooling bed opposite the first plate delivery table.]

19. An upcoiler and uncoiler for hot rolled strip comprising a cylindrical housing in scroll form split on a vertical plane into a larger and a smaller element, means pivoting each element of the housing about a fixed pivot at its lower edge, those lower edges being spaced vertically from each other so as to form the upper and lower edges of an entry into the housing at the bottom thereof, an entry guide leading into the entry, and parallel driven coil-supporting rolls at the same elevation straddling the vertical plane and forming a continuation of the lower end of the smaller element.

[20. Apparatus of claim 19 in combination with a conveyor table and spaced above it in which the entry guide is pivoted at its entry end and including means to raise or lower the outer end of the guide so as to clear or accept work passing beneath the upcoiler on the conveyor table.]

21. Apparatus of claim 19 including strip contacting means positioned in one housing element and means carried by that housing element for pressing those strip contacting means against the outside end of the strip coiled therein, and for retracting them.

22. Apparatus of claim 19 in combination with means to transfer coils coiled therein broadside to a conveyor table adjacent thereto, those transfer means comprising a track supported above the upcoiler and extending over the conveyor table, a car movable on that track, means carried by the car for picking up a coil in the coiler, and means carried by the car for raising the pick-up means above the coiler and for lowering them.

23. Apparatus of claim 22 in which the track is positioned so that the pick-up means enter the upcoiler from one side when the elements of the upcoiler housing are pivoted away from each other and move the coil out the other side of the upcoiler.

24. Apparatus of claim 22 in which the pick-up means in their lowered position are in line with the eye of a coil in the uncoiler.

25. Apparatus of claim 22 including strip contacting means depending from the car and means carried by the car for pressing those strip contacting means against the outside end of a coil supported by the means carried by the car for picking up a coil.

[26. The method of hot rolling a metal workpiece to strip or plate without reheating comprising passing the hot workpiece back and forth through a reversing roughing stand, collecting the product on either side of the roughing stand as a flat bar and feeding it back into the stand as a flat bar until it is reduced to coiling thickness, then passing the workpiece back and forth through the reversing roughing stand, coiling the product on either side of the roughing stand and feeding it back into the stand by paying off the coiled bar until it is reduced to finishing stand thickness, transferring the coiled bar of finishing stand thickness to a finishing train, uncoiling the bar and passing it through the finishing train, whereby reducing the temperature difference between the ends of the bar below that found in unidirectional multi-stand strip mills.]

[27. The method of claim 26 in which the product is collected and fed back on each side of the roughing stand as a flat bar by passing it under coiling apparatus on each side of the roughing stand until it is reduced to coiling gauge, and then collecting it and feeding it back on each side of the roughing stand in and from that coiling apparatus on each side of the roughing stand.]

[28. The method of hot rolling a metal workpiece to strip or plate without reheating in a roughing train and a finishing train comprising passing the hot workpiece through a first roughing stand so as to produce a flat bar of increased length and reduced thickness, passing that bar through a second roughing stand in tandem with the first roughing stand to produce a flat bar of further increased length and further reduced thickness, reversing the second roughing stand and passing the flat bar back through it in the reverse direction, repeating the rolling and reverse rolling until the flat bar is reduced to coiling thickness, coiling the hot bar as it comes from the second roughing stand, uncoiling the hot bar and passing it back through the second roughing stand in the reverse direction, coiling the bar on the other side of the second roughing stand, repeating the uncoiling rolling and coiling until the bar is reduced in thickness to finishing train entry thickness, then transferring the coiled bar to a finishing train, uncoiling it and passing it through the finishing train, thereby reducing the temperature difference between the ends of the bar below that found in unidirectional multi-stand strip mills.]

[29. The method of claim 28 in which the roughing and finishing trains are disposed parallel to each other, but in which the work product travels from end-to-end in opposite directions therein, and in which the coiled bar is transferred broadside from roughing to finishing train.]

[30. The method of hot rolling a metal workpiece to strip or plate comprising passing the hot workpiece back and forth through a reversing stand, collecting the product on either side as a flat bar and feeding it back into the stand as a flat bar until it is reduced to a stretched out flat bar of finishing stand thickness, which is greater than that of coiling thickness, transferring the stretched out bar broadside to a finishing stand spaced laterally from the roughing stand and passing it through the finishing stand along a path of travel at a different level from its path of travel through the roughing stand, and driving the roughing stand and the finishing stand separately from the same side.]

*31. In a semi-continuous mill installation for hot rolling metal work pieces into strip or plate having a heating furnace facility in line with a roughing train including a reversing roughing stand, a finishing train positioned parallel to the roughing train but opposite thereto in direction of work travel and separate driving means for the roughing train and the finishing train, the improvement comprising a space-saving and heat-conserving arrangement in which the roughing train and the finishing train are adjacent each other, the run-out table and coiling means only for the finishing train extend in front of the heating furnace facility, the separate driving means for each train are positioned on the heating furnace side of the roughing train, and the pass line of the finishing train is disposed below the pass line of the roughing train sufficiently for the driving spindles only of the finishing train to cross therebelow.*

*32. The installation of claim 31 in which the finishing train comprises a plurality of closed-coupled stands opposite the stands of the roughing train but offset therefrom so that the rolls from each stand can be withdrawn from the same side.*

*33. The installation of claim 31 in which the run-out table for the finishing stand extends beyond the heating furnace facility into a second roughing train having a reversing plate breakdown stand, and including a second finishing train having a reversing plate finishing stand, that train extending back in front of the heating furnace facility, and separate driving means for the plate breakdown stand and the plate finishing stand positioned on the heating furnace side of the second roughing train.*

*34. The installation of claim 31 in which the delivery means of the roughing train include a coiler, the entry means of the finishing train include payoff means, and including means to transfer coils broadside from the coiler to the payoff means.*

*35. The installation of claim 34 in which the roughing train comprises two reversing roughing stands in tandem, and an upcoiler positioned between the first roughing stand and the heating furnace facility.*

*36. In the method of rolling flat metal products including the step of reducing a hot slab to elongated stock by repeatedly passing it through the rolls of a roughing stand, coiling the hot stock as it is reduced in said roughing stand and then paying out the reduced hot stock and rolling it to final gauge in a finishing train, the improvement comprising rolling finished coils of weight less than the weight of the slab by paying out the coiled hot stock from the roughing stand into the finishing train and shearing the uncoiled hot stock immediately ahead of the finishing train after the desired weight of hot stock has entered the finishing train.*

*37. The method of claim 36 in which the desired weight of hot stock is a sub-multiple of the slab weight.*

*38. The method of claim 36 including the step of paying out an additional weight of the reduced hot stock into the finishing train and rolling it there to a gauge different from the gauge of the first rolled portion.*

* * * * *